(12) United States Patent
Ohhira

(10) Patent No.: US 7,779,158 B2
(45) Date of Patent: Aug. 17, 2010

(54) NETWORK DEVICE

(75) Inventor: Kohki Ohhira, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 358 days.

(21) Appl. No.: 11/853,377

(22) Filed: Sep. 11, 2007

(65) Prior Publication Data

US 2008/0071893 A1    Mar. 20, 2008

(30) Foreign Application Priority Data

Sep. 14, 2006   (JP)   ............... 2006-250041
Aug. 23, 2007   (JP)   ............... 2007-217175

(51) Int. Cl.
*G06F 15/16*   (2006.01)
*G06F 12/00*   (2006.01)

(52) U.S. Cl. .................. 709/245; 709/220

(58) Field of Classification Search ......... 709/220–222, 709/217–218, 225–229, 250, 245
See application file for complete search history.

(56) References Cited

U.S. PATENT DOCUMENTS

| | | | |
|---|---|---|---|
| 2004/0019664 A1* | 1/2004 | Le et al. | 709/220 |
| 2004/0184467 A1* | 9/2004 | Watanabe | 370/401 |
| 2004/0230446 A1* | 11/2004 | Park et al. | 705/1 |
| 2005/0018645 A1* | 1/2005 | Mustonen et al. | 370/349 |
| 2005/0018677 A1* | 1/2005 | Lee et al. | 370/389 |
| 2005/0041675 A1* | 2/2005 | Trostle et al. | 370/401 |
| 2006/0190717 A1 | 8/2006 | Ohhira | |
| 2007/0047550 A1* | 3/2007 | Takayama | 370/392 |

* cited by examiner

*Primary Examiner*—Zarni Maung
(74) *Attorney, Agent, or Firm*—Oblon, Spivak, McClelland, Maier & Neustadt, L.L.P.

(57) ABSTRACT

In a network device which provides a predetermined network service according to a request of a user, an IP-address generating unit is configured to generate an IP address from a value having an association with the network service, the IP address indicating an objective association with the network service. A service provision unit is configured to set up the generated IP address for the network device to provide the network service using the generated IP address.

8 Claims, 15 Drawing Sheets

FIG.16

SUFFIX LIST

| TRANSPORT TYPE | PORT NUMBER | SUFFIX |
|---|---|---|
| TCP | 10000 | ::123:4567:89ab:cdef |
| TCP | 80 | ::aaaa:aaaa:aaaa:aaaa |
| TCP | 80 | ::bbbb:bbbb:bbbb:bbbb |

NETWORK DEVICE

BACKGROUND OF THE INVENTION

1. Field of the Invention

This invention relates to a network device which has a server function.

2. Description of the Related Art

In recent years, the networking using IP (Internet Protocol) is expected to grow in use, and the IP is adopted by many network devices. Although the IP was constructed by considering the use over the Internet as a premise, it is now widely applied to private networks, and many people benefit from the effects of the IP.

In the IP, network devices communicate with each other using IP addresses. As shown in FIG. 1, a network device #1 which originates communication acquires the IP address of a destination network device #2 using a certain mechanism, and realizes the communication by transmitting a packet from its own IP address to the IP address of the destination and receiving a packet therefrom.

The IP which is most widely used at present is IPv4 (Internet Protocol version 4). According to this IP, about 4,200 million IP addresses are prepared. Namely, it can be said that 4,200 million network devices can communicate with each other. However, the population in the world already exceeds 6 billion people, and this means that one person cannot have a network device according to IPv4.

In fact, one person usually uses two or more IP network devices. For example, one person has a PC (personal computer) for office use and has also another PC for home use. Moreover, besides the PCs, the person may have a cellular phone capable of performing IP communication, a digital camera capable of performing IP communication, and home electronics, such as a videocassette recorder and a home server. In such a situation, the number of 4,200 million IPv4 addresses is too small.

To solve the problem, a new IP called IPv6 (Internet Protocol version 6) has been proposed. While the IPv4 address was 32 bits in length and the number of IP addresses was 4,200 million, the IPv6 address has an extended length to 128 bits. Thereby, the number of IP addresses which can be used according to the IPv6 becomes an astronomical numerical value, and a substantially infinite number of network devices can communicate with each other.

According to the IPv6, IP addresses can be assigned for miscellaneous network devices which were not able to use IP. According to the IPv4, one IP address was assigned to one network device, while according to the IPv6, assigning two or more IP addresses to one network device is taken into consideration.

When management of the IPv6 address is carried out, the IP address is divided into two parts: a prefix part and a suffix part. Specifically, as shown in FIG. 2, the higher-rank 64 bits of the 128-bit IP address are called a prefix, and the lower-rank 64 bits thereof are called a suffix.

In IPv6 environment, it is supposed that IP addresses generally are automatically set up except for the special cases. In the automatic setting of IP addresses, a prefix and a suffix are determined separately and a new 128-bit IP address is created by combining them.

In the case of IPv6 address called a link local address, a prefix is a fixed value and it is predetermined according to the specification of IPv6. Namely, the fixed value of the prefix is "fe80:0000:0000:0000::/64". In many cases in which a global address is determined, the global address is determined according to the information indicated in a packet called RA (router advertisement) which is transmitted over a network. In the RA, a prefix which is valid within the network is contained. Thus, the prefix to be allocated for each network device is obtained from the information indicated in the RA.

The suffix is individually determined by each network device. In many cases, each network device uses its own MAC (media access control) address as the base and sets up an IP address for the network device. The MAC address usually is managed according to the 48-bit numbering system called EUI (extended unique identifier)-48. It is guaranteed that, if a MAC address follows the EUI-48, it is unique among those following the EUI-48. For this reason, the duplication of a MAC address may not take place among NICs (network interface cards) in the world.

And EUI-64 is proposed as the high-order standard of EUI-48. The numbering system according to EUI-48 is mapped to EUI-64, and converting the numerical value of EUI-48 into the numerical value of EUI-64 is possible.

A 64-bit numerical value of EUI-64 is generated from a MAC address by using the above-mentioned conversion, so that the suffix is obtained.

As a result of the above procedure, the prefix and the suffix are obtained, and a 128-bit numerical value can be generated by combining them. The generated IPv6 address is set up for the network device concerned.

Any publication of the prior art technology that is particularly relevant to this invention cannot be discovered at the time of filing of the application. Therefore, information on prior art documents is not disclosed.

A network device inherently provides a certain network service according to a request of a user, but the IP address of the network device may be an IPv4 address which is arbitrarily defined by the administrator, or an IPv6 address which is automatically set up based on the MAC address as mentioned above. There is a problem that it is difficult to discover the network service from another network device of the side which requests the network service.

Moreover, the network service and the IP address conventionally have no direct association, and the setting of filtering, routing, IPsec (security architecture for Internet Protocol), etc. must be individually perform for every IP address. Such operation is complicated.

SUMMARY OF THE INVENTION

According to one aspect of the invention, there is provided an improved network device in which the above-described problems are eliminated.

According to one aspect of the invention there is provided a network device which generates an IP address indicating an objective association with a network service and sets up the IP address for the network device, so that discovering of the network service from another network device and the setting of filtering, routing, IPsec, etc. for every network service are facilitated.

In an embodiment of the invention which solves or reduces one or more of the above-mentioned problems, there is provided a network device which provides a predetermined network service according to a request of a user, the network device comprising: an IP-address generating unit configured to generate an IP address from a value having an association with the network service, the IP address indicating an objective association with the network service; and a service provision unit configured to set up the generated IP address for the network device to provide the network service using the generated IP address.

The above-mentioned network device may be arranged so that the IP-address generating unit is configured to embed an auxiliary address in a part of the IP address so that the IP address is generated.

The above-mentioned network device may be arranged so that the IP-address generating unit is configured to embed a port number of TCP or UDP in a suffix part of an IPv6 address so that the IPv6 address is generated.

The above-mentioned network device may be arranged to further comprise: a unit configured to determine, before setting up the generated IP address for the network device, whether the generated IP address is already used by another network device; a unit configured to change a numerical value of a suffix part of the generated IP address when the generated IP address is already used; and a unit configured to perform a duplication check of the changed IP address again.

The above-mentioned network device may be arranged to further comprise: a unit configured to perform a binary-coded decimal conversion of the port number before embedding the port number in the suffix part of the IPv6 address; and a unit configured to embed a port number value as a result of the binary-coded decimal conversion in the suffix part of the IPv6 address.

In an embodiment of the invention which solves or reduces one or more of the above-mentioned problems, there is provided an IP address setting controlling method for use in a network device which provides a predetermined network service according to a request of a user, the method comprising the steps of: generating an IP address from a value having an association with the network service, the IP address indicating an objective association with the network service; and setting up the generated IP address for the network device to provide the network service using the generated IP address.

According to embodiments of the network device of the invention, an IP address indicating an objective association with a network service is generated and the IP address is set up for the network device, and it is possible to facilitate discovering of the network service from another network device and the setting of filtering, routing, IPsec, etc. for every network service.

BRIEF DESCRIPTION OF THE DRAWINGS

Other objects, features and advantages of the present invention will be apparent from the following detailed description when reading in conjunction with the accompanying drawings.

FIG. 16 is a diagram showing an example of a suffix list.

DETAILED DESCRIPTION OF PREFERRED EMBODIMENTS

A description will be given of embodiments of the invention with reference to the accompanying drawings.

A fundamental processing of the invention will be explained. When a network device of the invention starts providing of a network service as a server, an IP address having a suffix which is predetermined for the network service is assigned for the network device so that the network service is provided using the IP address. Alternatively, when a network device of the invention starts providing of a network service as a server, an IP address having a suffix which is easily derived from the network service is assigned for the network device so that the network service is provided using the IP address.

Figure 1:
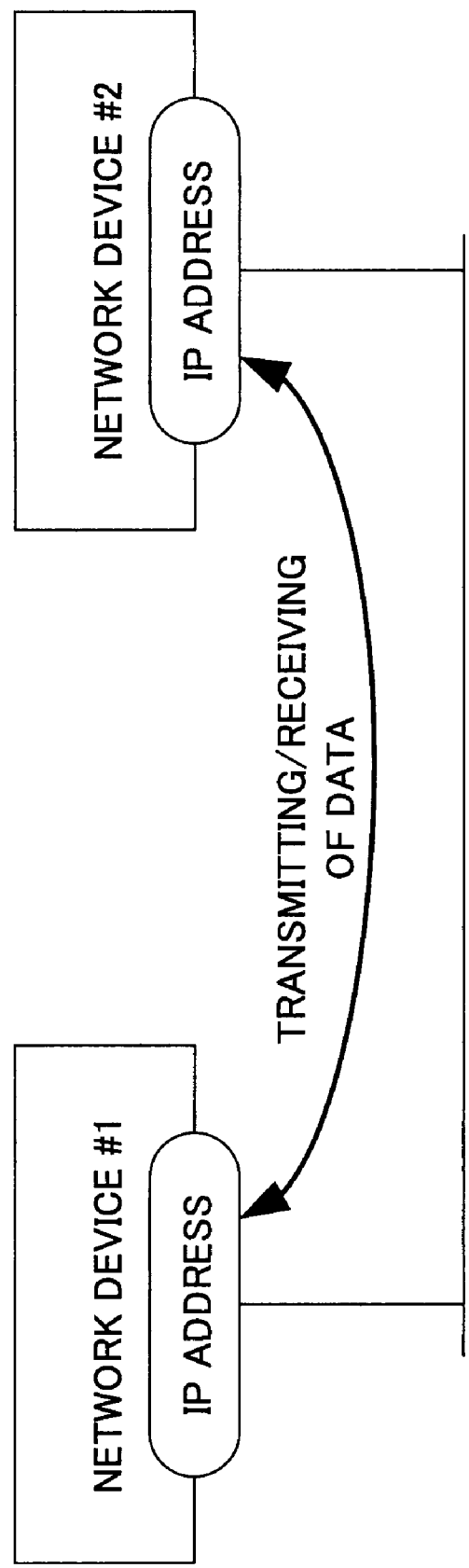
FIG. 1 is a diagram for explaining the situation in which network devices communicate with each other using IP addresses.
Figure 2:
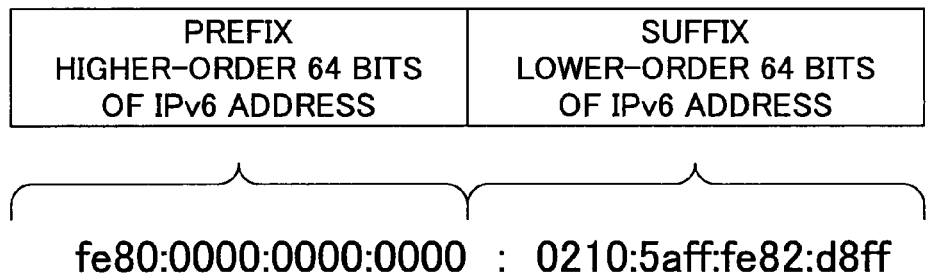
FIG. 2 is a diagram showing the structure of IPv6 address.
Figure 3:
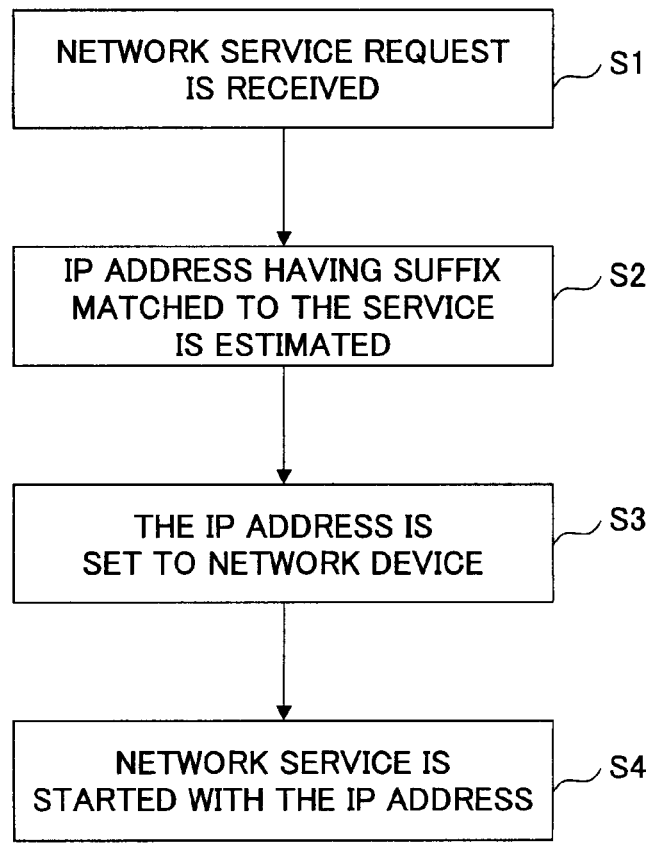
FIG. 3 is a flowchart for explaining the fundamental processing of the invention.

FIG. 3 is a flowchart for explaining the fundamental processing of the invention.

As shown in FIG. 3, when providing of a new network service is started by a network device of the invention (step S1), the network device selects a suffix that is suitable for the network service (step S2), sets an IP address having the suffix for the network device by itself (step S3), and provides the network service using the IP address (step S4).

Accordingly, the network device of the invention provides the following advantages:

(1) when a user wants to use a network service, the network service is provided using an IP address that is publicly known about the service or easily derived from the service, and this makes it possible to easily discover that network service from another network device.

(2) changing an IP address for every network service is possible, and this makes it is easy to perform the setting of filtering, routing, and IPsec for every service.

A description will be given of an embodiment of the invention. In this embodiment, an IP address is individually assigned for each of network services which are provided to users. When providing of a network service is started, the network device of this embodiment is connected with an IP address which is predetermined for the network service.

To realize this, the server (or the network device of this embodiment) is adapted so that, when the server starts providing of a network service, the server has a port number (port number of TCP (transmission control protocol) or UDP (user datagram protocol)) for providing the service, with a fixed value, and embeds the numerical value of the port number in the suffix of the IP address, so that the service is provided using the IP address having that suffix.

Figure 4:
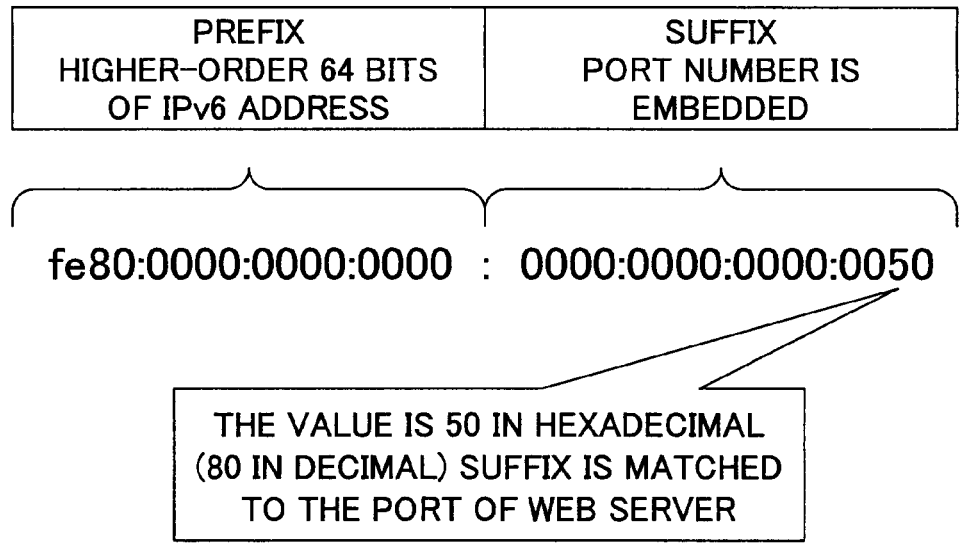
FIG. 4 is a diagram showing an example of an IP address in an embodiment of the invention, including a suffix with a port number embedded therein.

FIG. 4 shows an example of an IP address in this embodiment which includes a suffix in which a port number is embedded therein. For example, when providing a network service of HTTP (hyper text transfer protocol), the well-known port of HTTP is "80". When providing a network service of HTTP, the server sets up the IP address including this value in the suffix for the server, so that the service is provided using the IP address. Accordingly, the IP address of the host which provides HTTP service can be discovered easily.

Figure 5:
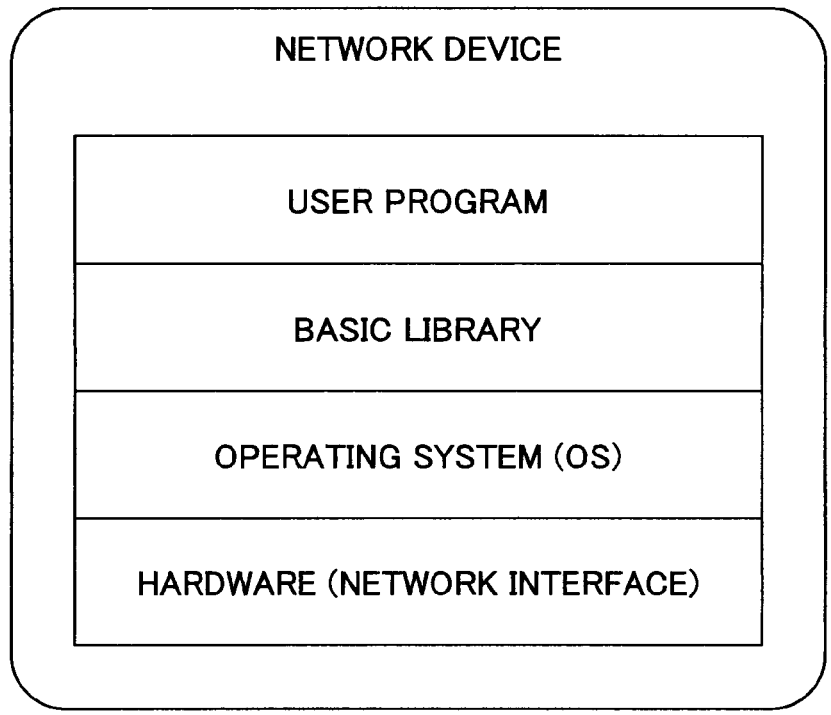
FIG. 5 is a diagram showing the software composition of a network device according to the related art to which the invention is not applied.

FIG. 5 shows the software composition of a network device according to the related art without the above-mentioned feature of the invention.

In the conventional system, the hardware (network interface) is provided, the OS (operating system) is provided for controlling the hardware, and the basic library is provided on the OS for using a computer resource from a user program. And the user program is provided on the basic library.

Figure 6:
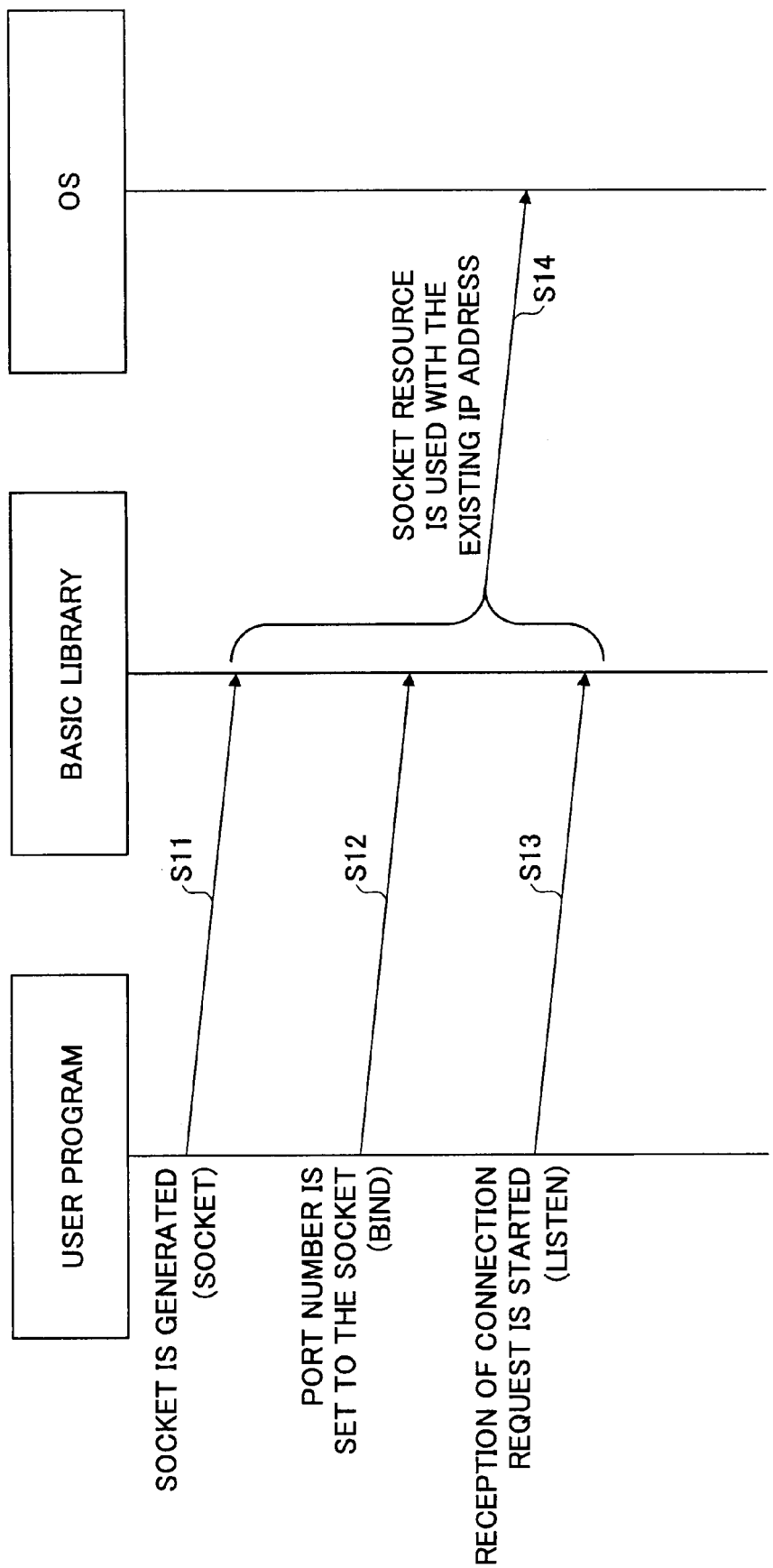
FIG. 6 is a sequence diagram for explaining the processing performed with the software composition of FIG. 5.

FIG. 6 is a sequence diagram for explaining the server processing which is performed to start providing of a network service in the environment including a network-service API (application program interface) known as a socket.

In the processing of FIG. 6, the server process which is the user program requests sequentially socket generation (step S11), port setting (step S12), and start of reception of a connection-request (step S13) to the basic library. And the OS performs reservation of network resource and starting of using the network resource based on the information received from the basic library (step S14).

In the conventional system, any procedure, such as the setting of a new IP address according to the user's service port, is not provided. In contrast, the network device of this embodiment provides the above-mentioned procedure.

Figure 7:
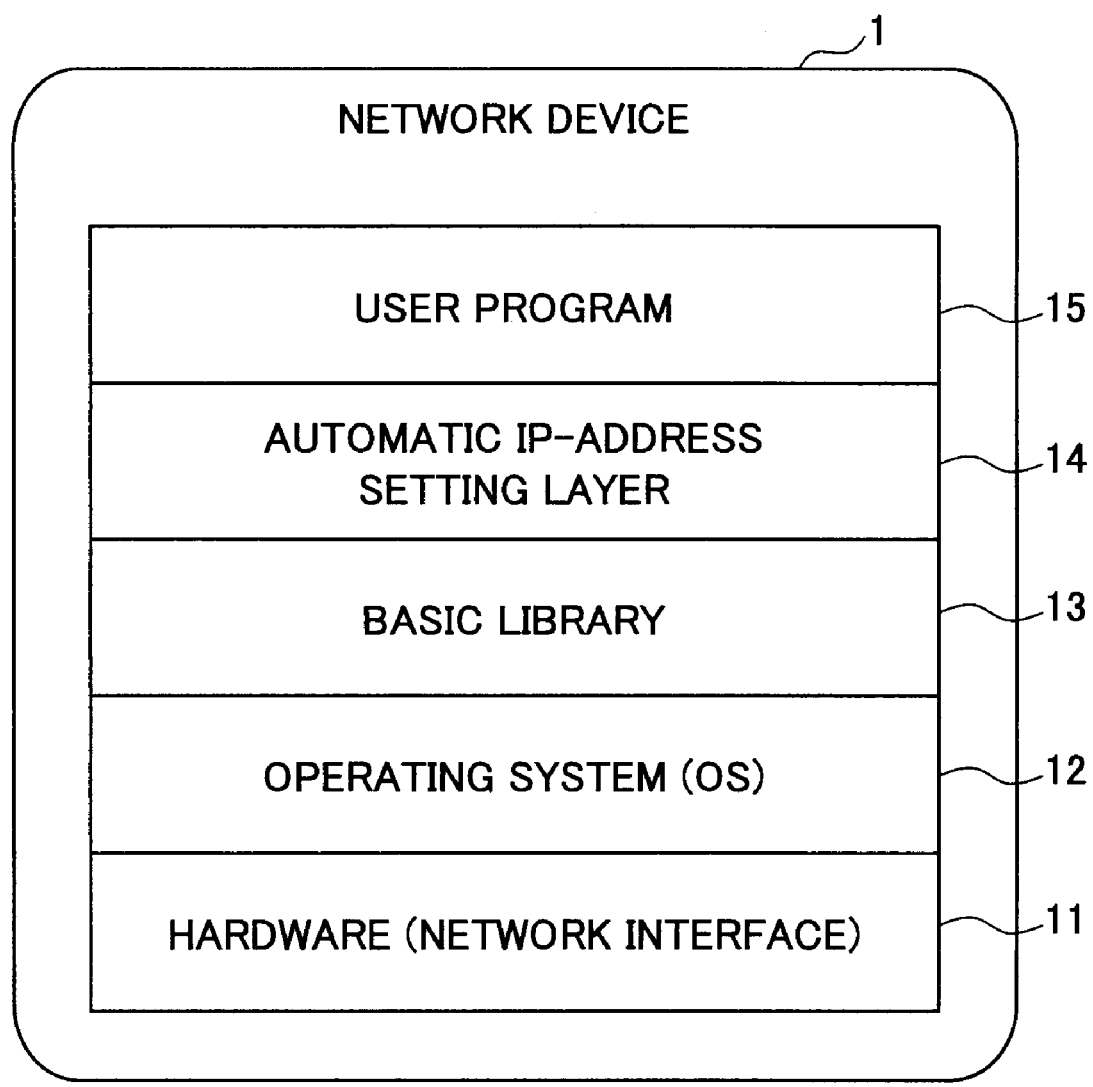
FIG. 7 is a diagram showing the software composition of a network device in an embodiment of the invention.

FIG. 7 shows the software composition of the network device of this embodiment.

In the composition of FIG. 7, the network device 1 is provided with the hardware 11, the OS 12 for controlling the hardware, and the basic library 13 on top of the OS for using a computer resource. Moreover, the network device 1 is provided with the automatic IP-address setting layer 14 on the basic library 13 for setting up an IP address automatically, and the user program 15 on top of the automatic IP-address setting layer 14. Namely, the automatic IP-address setting layer 14 is arranged between the basic library and the user program in the conventional composition. In the automatic IP-address setting layer 14, the user program 15 gets to know the port which requests start of network service provision, and the setting layer 14 sets up the IP address according to the port automatically and causes the network service to start by using that IP address.

Figure 8:
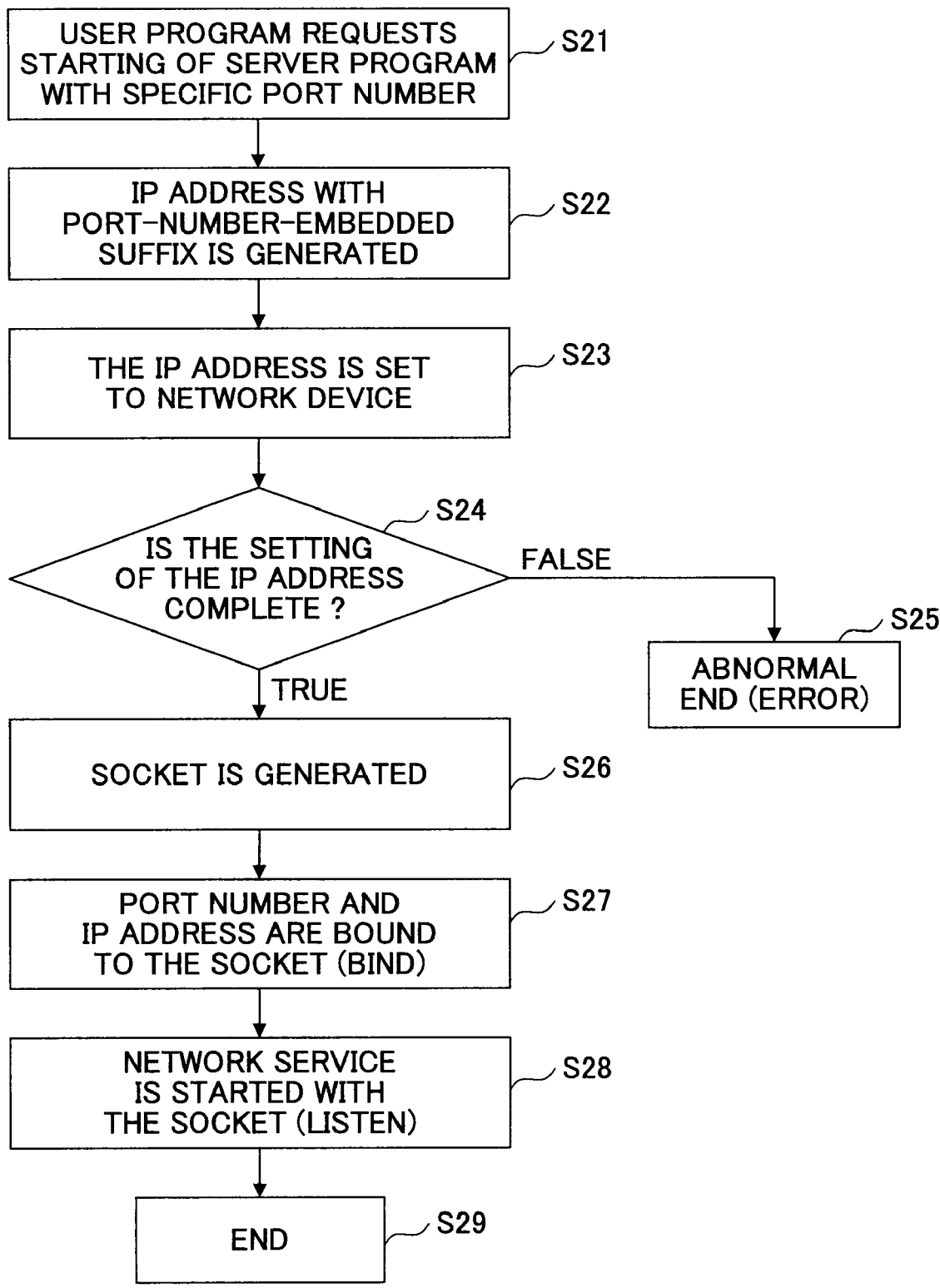
FIG. 8 is a flowchart for explaining the processing performed by the network device of FIG. 7.

FIG. 8 is a flowchart for explaining the processing which is performed by the network device of FIG. 7.

In the flowchart of FIG. 8, when a user wishes server generation (step S21), the port number being used by the server is obtained, a 64-bit sequence of the port number is generated according to the value of the port number, and an IP address including the suffix in which the sequence of the port number is embedded is generated (step S22). And the generated IP address is set up for the network device 1 (step S23).

Subsequently, it is determined whether the setup of the IP address is complete successfully (step S24). When the result of the determination at step S24 is negative (FALSE), the proceeding is ended abnormally (notification of an error) (step S25).

When the result of the determination at step S24 is affirmative (TRUE), socket generation is performed assuming that a listen processing is performed using the IP address (step S26). The port number and the IP address are bound to the socket (step S27), and the network service is provided using the socket (step S28, S29).

Figure 9:
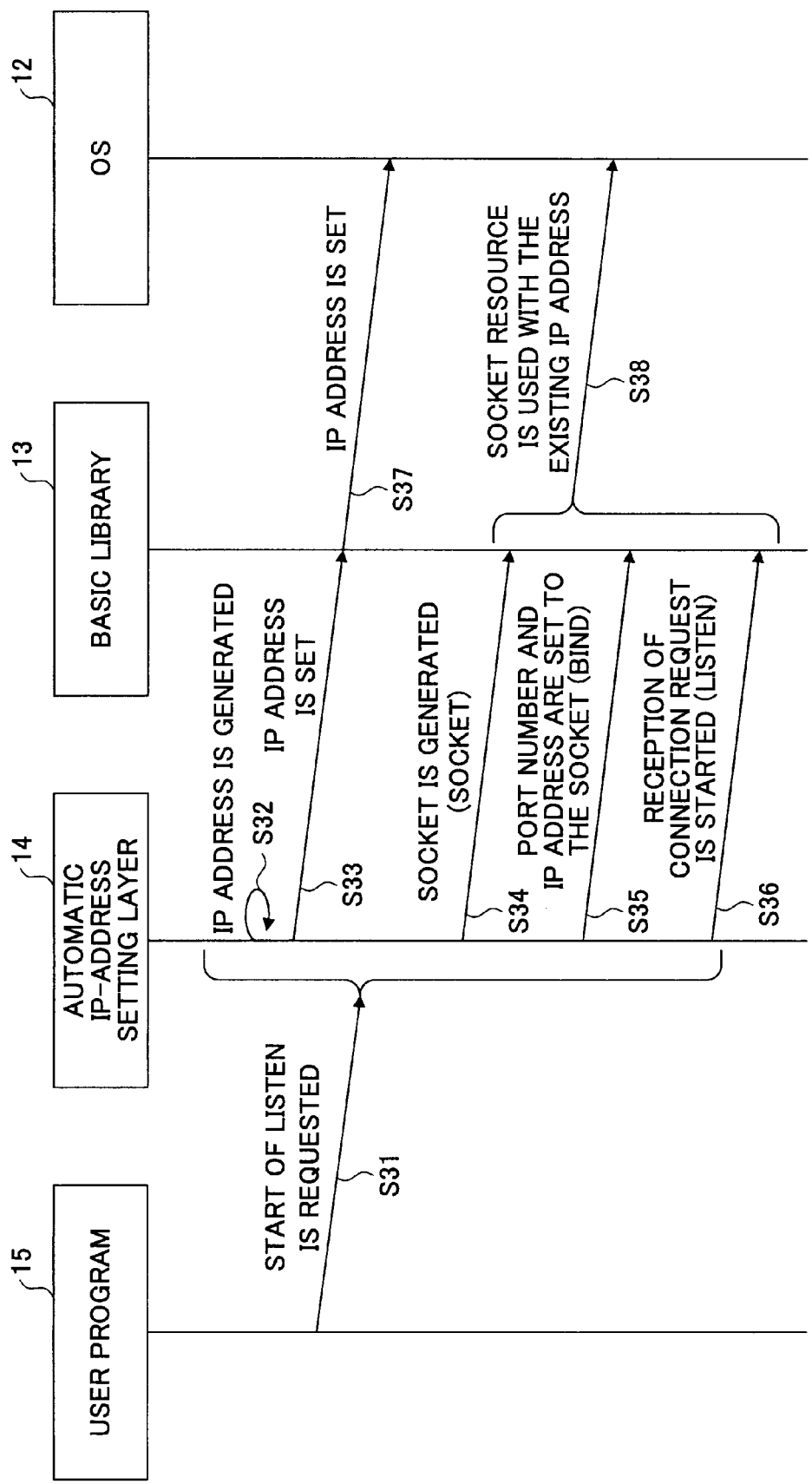
FIG. 9 is a sequence diagram for explaining the processing performed with the software composition of FIG. 7.

FIG. 9 is a sequence diagram for explaining the processing which is performed with the software composition of FIG. 7.

In the sequence diagram of FIG. 9, the user program 15 requests the automatic IP-address setting layer 14 to specify the port and start the listen processing (step S31).

Subsequently, the automatic IP-address setting layer 14 generates the IP address (step S32), sets up the IP address (step S33), generates the socket (step S34), and binds the port number and the IP address to the socket (step S35), and performs the listen processing to start the reception of a connection request (step S36). These steps are operated to the OS 12 through the basic library 13. The OS 12 performs the setting of the IP address (step S37) and performs the use of the socket resource with the IP address (step S38).

In the above-mentioned procedure, the server program is operated using the IP address which is generated according to the server port number requested by the user program 15. Accordingly, the IP address as shown in FIG. 4 is set up for the network device and providing of the network service using the IP address is started.

Next, a description will be given of another embodiment of the invention. In the previously described embodiment, the automatic IP-address setting layer 14 which is the intermediate software of the user program is adapted for carrying out the automatic IP address setting. In this embodiment, the automatic IP address setting is carried out by the processing performed within the OS 12.

Figure 10:
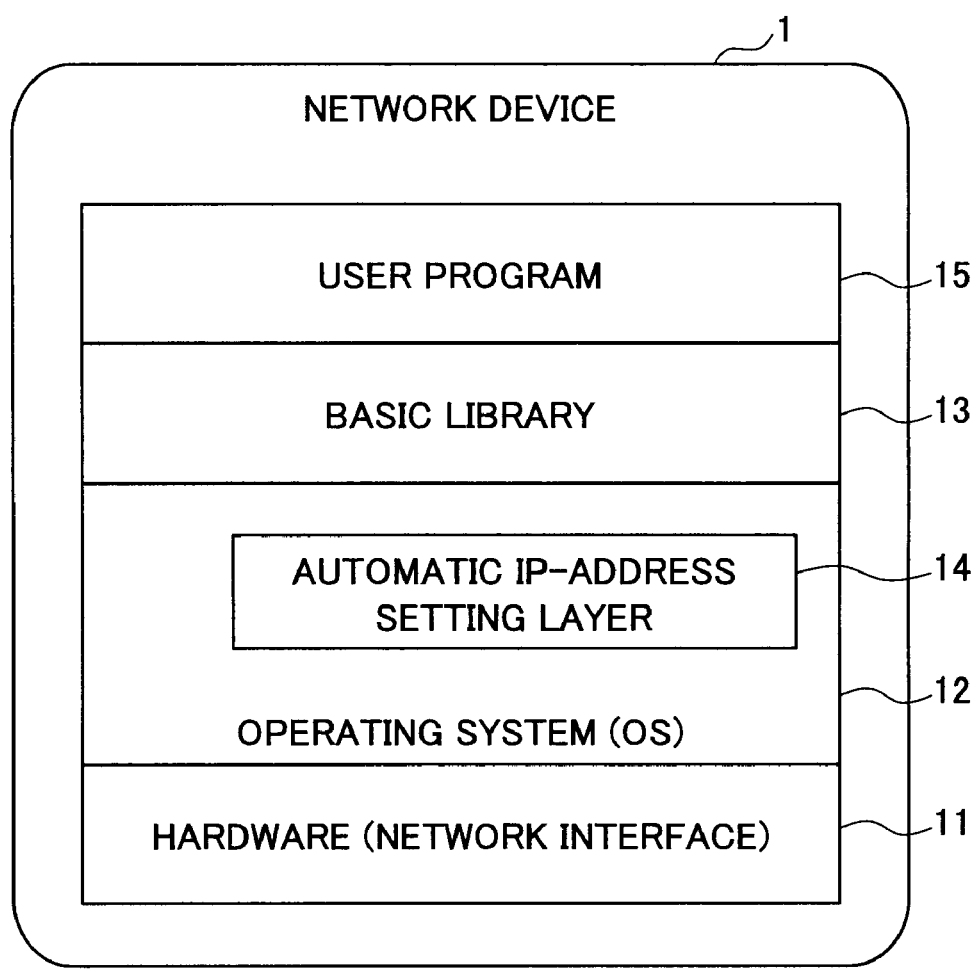
FIG. 10 is a diagram showing the software composition of a network device in an embodiment of the invention.

FIG. 10 shows the software composition of a network device in this embodiment. As shown in FIG. 10, the automatic IP-address setting layer 14 which performs the automatic IP-address setting is provided in the OS 12. When a request for generating a socket for a server is received, the OS 12 generates a new IP address according to the received request, and starts reception of a connection-request using the IP address.

Figure 11:
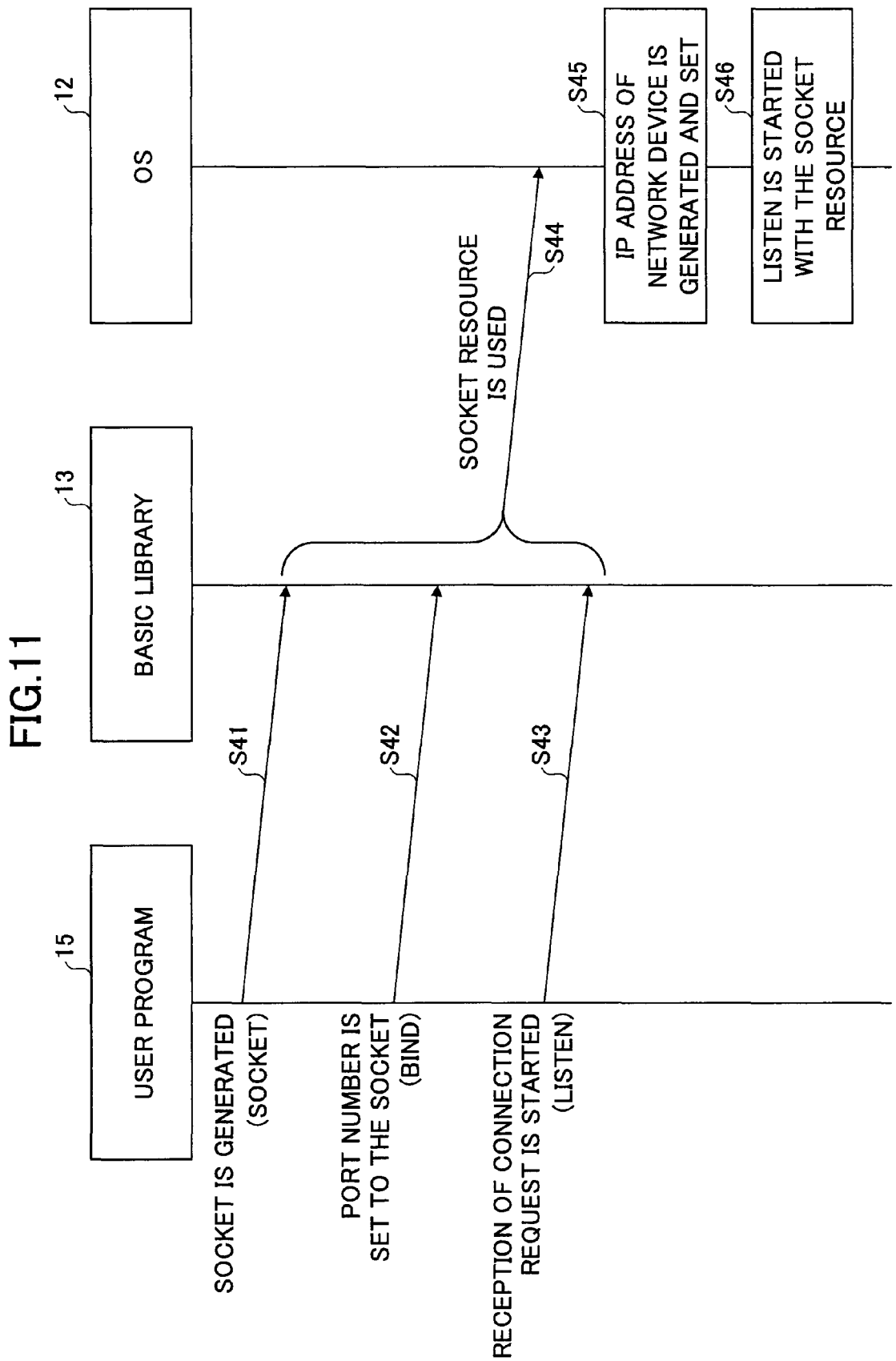
FIG. 11 is a sequence diagram for explaining the processing in which the network server generates an IP address with the software composition of FIG. 10.

FIG. 11 is a sequence diagram for explaining the processing in which the network server generates an IP address with the software composition of FIG. 10. As shown in FIG. 11, when the request for generating the socket is normally received from the user program 15 via the basic library 13 (steps S41-S44), the OS 12 generates a new IP address according to the received request and sets up the IP address for the network device automatically (step S45). And the OS 12 performs the listen processing using the IP address (step S46).

Figure 12:
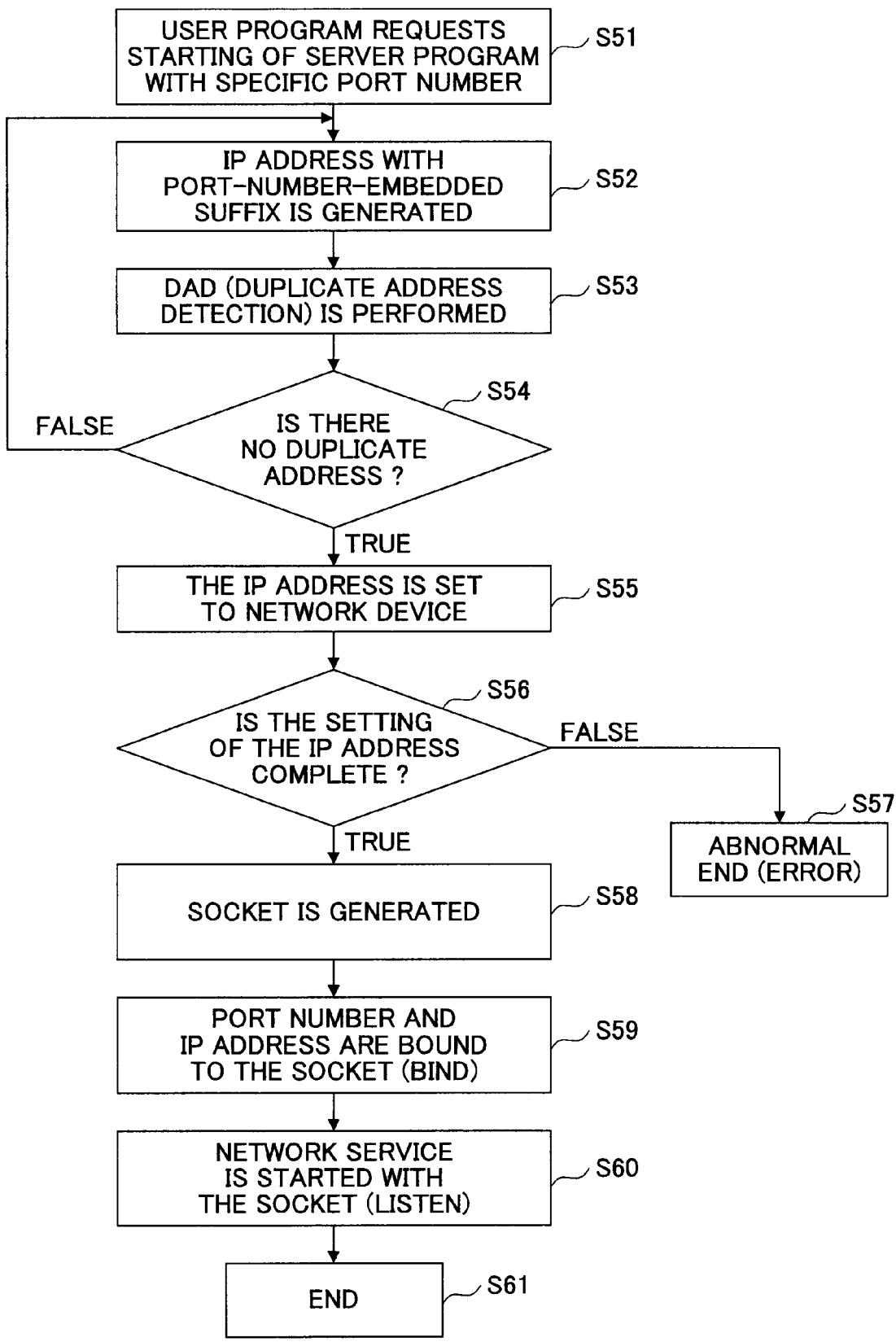
FIG. 12 is a flowchart for explaining a listen processing which is performed by the OS in the software composition of FIG. 10.

FIG. 12 is a flowchart for explaining the listen processing which is performed by the OS in the software composition of FIG. 10.

In the flowchart of FIG. 12, when a request for starting the server program is received from the user program 15 (step S51), the OS 12 generates a new IP address (step S52), and determines whether there is a duplicate IP address in the same network (step S53, S54).

When there is no duplicate IP address (TRUE), the IP address is set up for the network device (step S55). When there is a duplicate IP address (FALSE), the control is returned to the step S52. Namely, a new IP address is generated (step S52) and the duplication check of the new IP address is performed again (step S53, S54).

Subsequently, it is determined whether the setting of the IP address is complete successfully (step S56). When the result of the determination at step S56 is negative (FALSE), the processing is ended abnormally (notification of an error) (step S57).

When the result of the determination at step S56 is affirmative (TRUE), socket generation is performed (step S58), the port number and the IP address are bound to the socket (step S59), and the listen processing is performed (step S60, S61).

As for the processing (step S52) performed when the generated IP address is already used, incrementing of the value of the portion other than the port number may be performed, and the IP address with the incremented value is considered as a new IP address. When the generated IP address is already used, incrementing of the value is performed again, and the IP address with the incremented value is considered as a new IP address. The above processing is repeated until a unique IP address which is not currently used in the network is discovered, so the IP address is set up for the network device of this embodiment.

Figure 13:
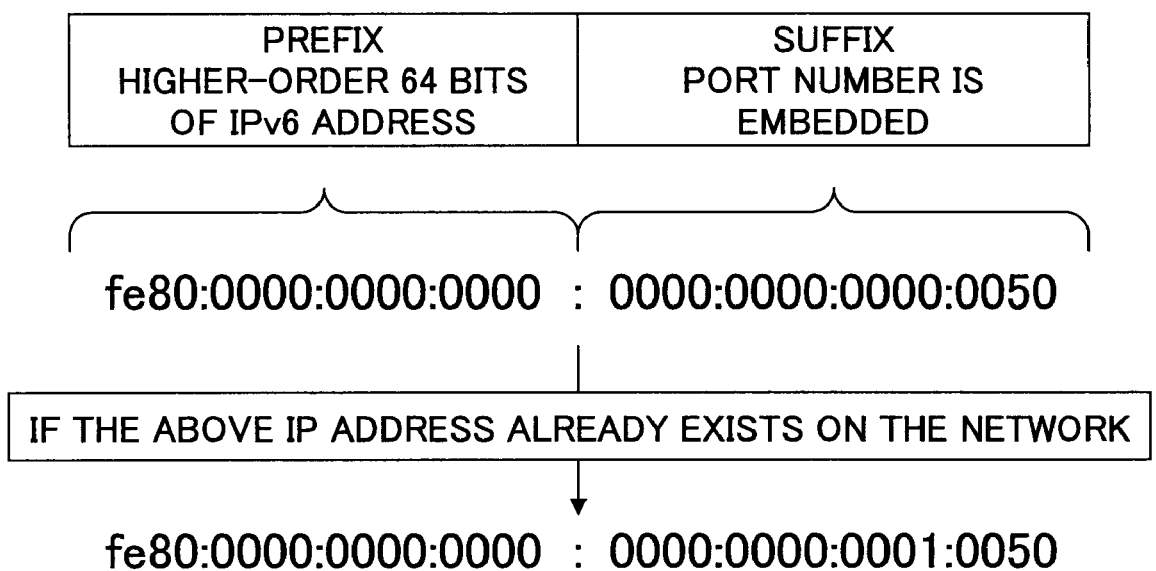
FIG. 13 is a diagram showing a countermeasure taken for resolving the case in which a generated IP address is the same as that of another network device.

FIG. 13 shows a countermeasure taken for resolving the case in which the generated IP address is the same as that of another network device. In the case of FIG. 13, when an IP address including a prefix "fe80:0000:0000:0000" and a suffix "0000:0000:0000:0050" already exists on the network, the suffix is changed to "0000:0000:0001:0050".

A description will be given of another embodiment of the invention. In the previously described embodiments, a new IP address in which the value of a port number is put into a part of the suffix of the IP address is generated. However, even when the countermeasure according to the previous embodiments is taken, the result of the countermeasure being taken is unclear to the user. This is because the IPv6 address is expressed in hexadecimal while the port number usually is expressed in decimal.

For this reason, even if the IPv6 address is viewed by the user, it is unclear to the user what network service is provided by the IPv6 address. For example, when the user wishes to provide a HTTP service of the port "80", the numerical value "50H" in hexadecimal is included in the IP address. It is difficult for the user to notice that the HTTP service of the port "80" is provided. When the telnet of the port "23" is provided, the number "17" is set up for the IP address of the network device, and it is difficult for the user to notice that the service is provided.

To solve the problem, the network device of this embodiment is adapted so that, when the numerical value included in the suffix of the IP address is computed from the existing port number, the binary-coded decimal (BCD) conversion of the port number is performed without using the existing port number, and the converted value is embedded in the suffix.

The software composition of the network device in this embodiment may be the same as the software composition of FIG. 7 or FIG. 10.

Figure 14:
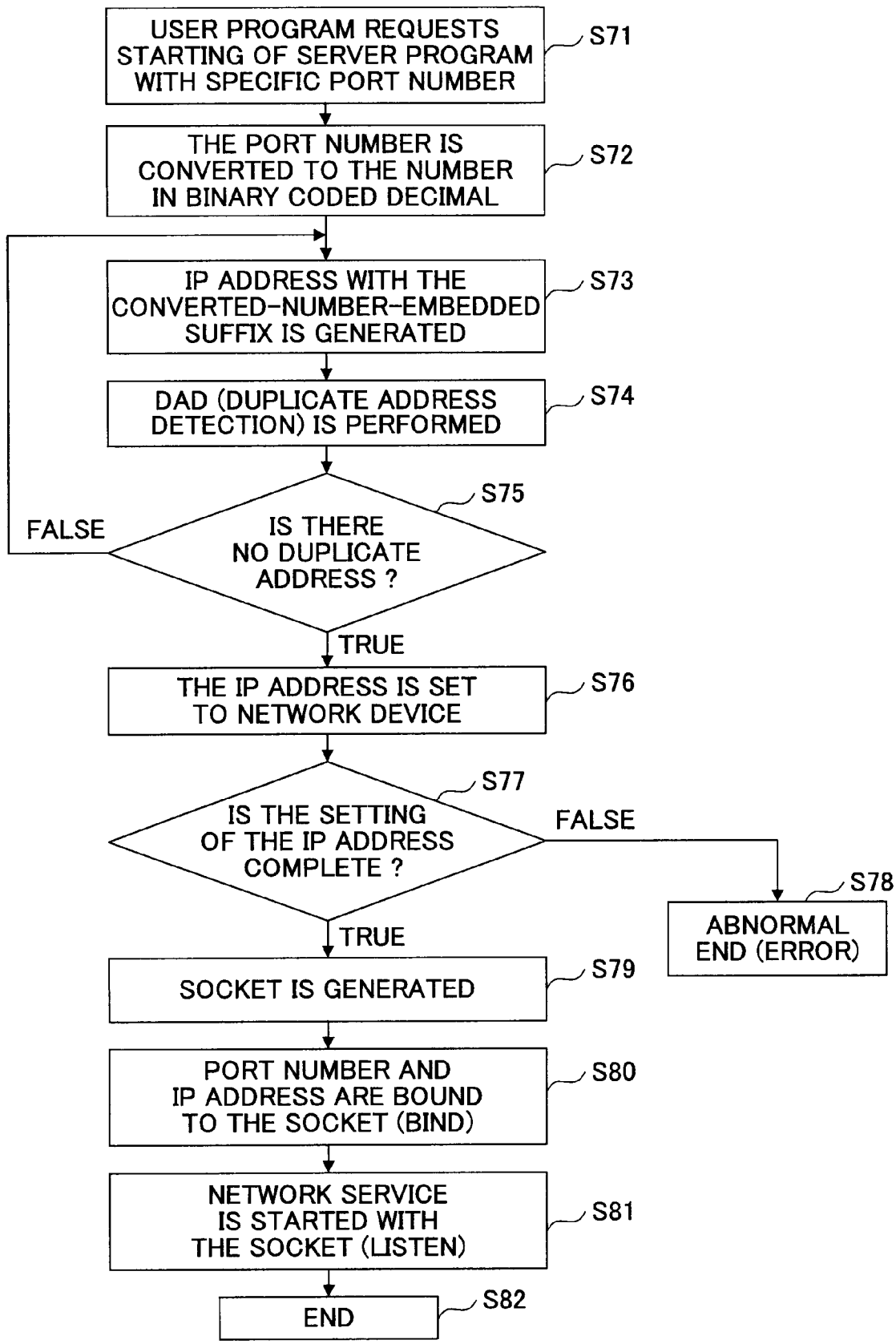
FIG. 14 is a flowchart for explaining the processing performed by a network device in an embodiment of the invention in which a binary-coded decimal port number is embedded in a suffix.

FIG. 14 is a flowchart for explaining the processing which is performed by the network of this embodiment in which a binary-coded decimal port number is embedded in a suffix.

In the flowchart of FIG. 14, when a request for starting a server program is received from the user program 15 (step S71), a binary-coded decimal conversion of a port number value is performed (step S72), and a new IP address is generated (step S73). And it is determined whether the generated IP address is the same as that in the same network (step S74, S75).

When the generated IP address is not the same as that in the same network (TRUE), the generated IP address is set up for the network device (step S76). When the generated IP address is the same as that in the same network (FALSE), the control is returned to step S73. Namely, a new IP address is generated (step S73), and the duplication check is performed again (step S74, S75).

Subsequently, it is determined whether the setup of the IP address is complete successfully (step S77). When the result of the determination at step S77 is negative (FALSE), the processing is ended abnormally (notification an error (step S78).

When the result of the determination at step S77 is affirmative (TRUE), socket generation is performed (step S79), the port number and the IP address are bound to the socket (step S80), and the listen processing is performed (step S81, S82)

The IP address setting processing in this embodiment is the same as that shown in FIG. 12. In the processing, provision of a HTTP service of the port "80" is started, and the number "50" is embedded in the suffix of the IPv6 address which is represented by the hexadecimal notation. The situation is as shown in FIG. 13.

Figure 15:
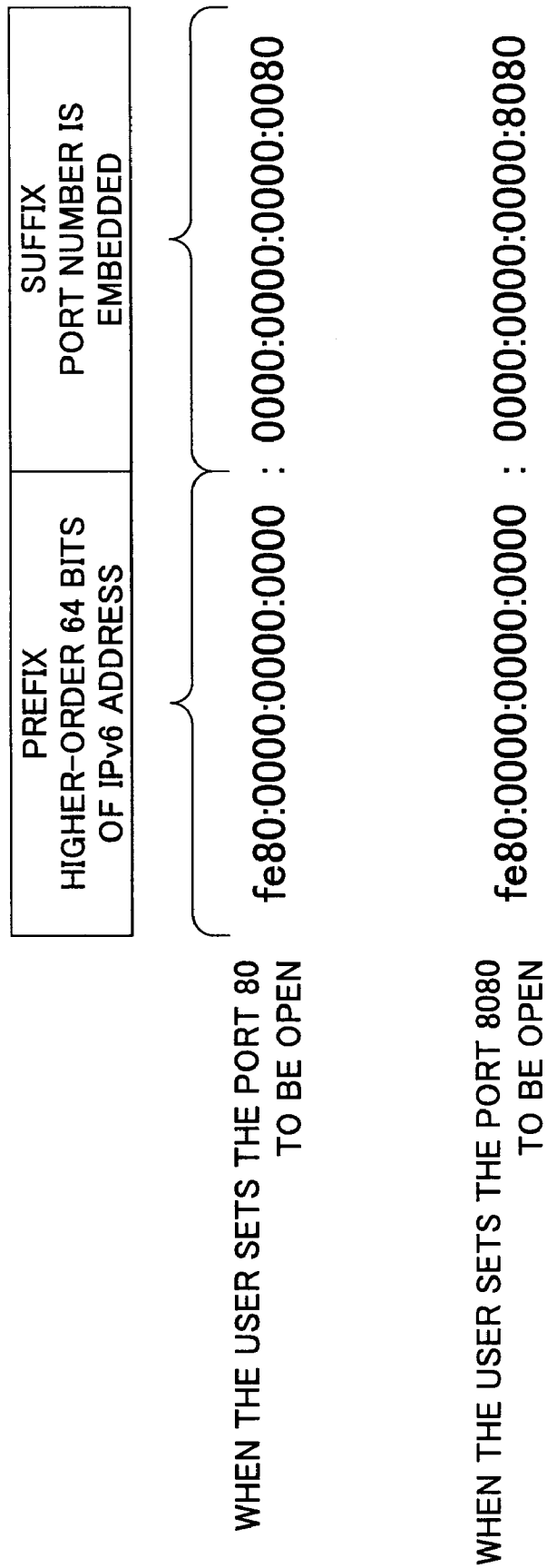
FIG. 15 is a diagram showing an example of an IP address which set up through a binary-coded decimal conversion.

In contrast, when the processing of FIG. 14 is used and the port number is "80" as shown in FIG. 15, the numerical value included in the IPv6 address of the hexadecimal notation is set to "80". It is apparently the same as the port number "80" of the decimal notation.

Similarly, when the port number is "8080", the numerical value included in the IPv6 address (hexadecimal) is set to "8080". Accordingly, since the port number in decimal usually used by the user is directly included in the IP address (in hexadecimal), the visibility of the user can be increased and it is possible to facilitate discovering of the network service from another network device.

A description will be given of another embodiment of the invention. In this embodiment, a suffix list (table) in which respective suffixes are defined according to transport type and port number is provided beforehand, and when the socket is opened, the corresponding IP address is selected from the suffix list (table) and the selected IP address is set up for the network device of this embodiment.

FIG. 16 shows an example of a suffix list. As shown in FIG. 16, respective associations between "transport type", "port number", and "suffix" are defined and held in the suffix list.

Specifically, in the example of FIG. 16, the suffix "::123:4567:89ab:cdef" is associated with the transport type "TCP" and the port number "10000", the suffix "::aaaa:aaaa:aaaa:aaaa" is associated with the transport type "TCP" and the port number "80", and the suffix "::bbbb:bbbb:bbbb:bbbb" is associated with the transport type "TCP" and the port number "80".

The software composition of the network device in this embodiment may be the same as the composition of FIG. 7 or FIG. 10.

Figure 17:
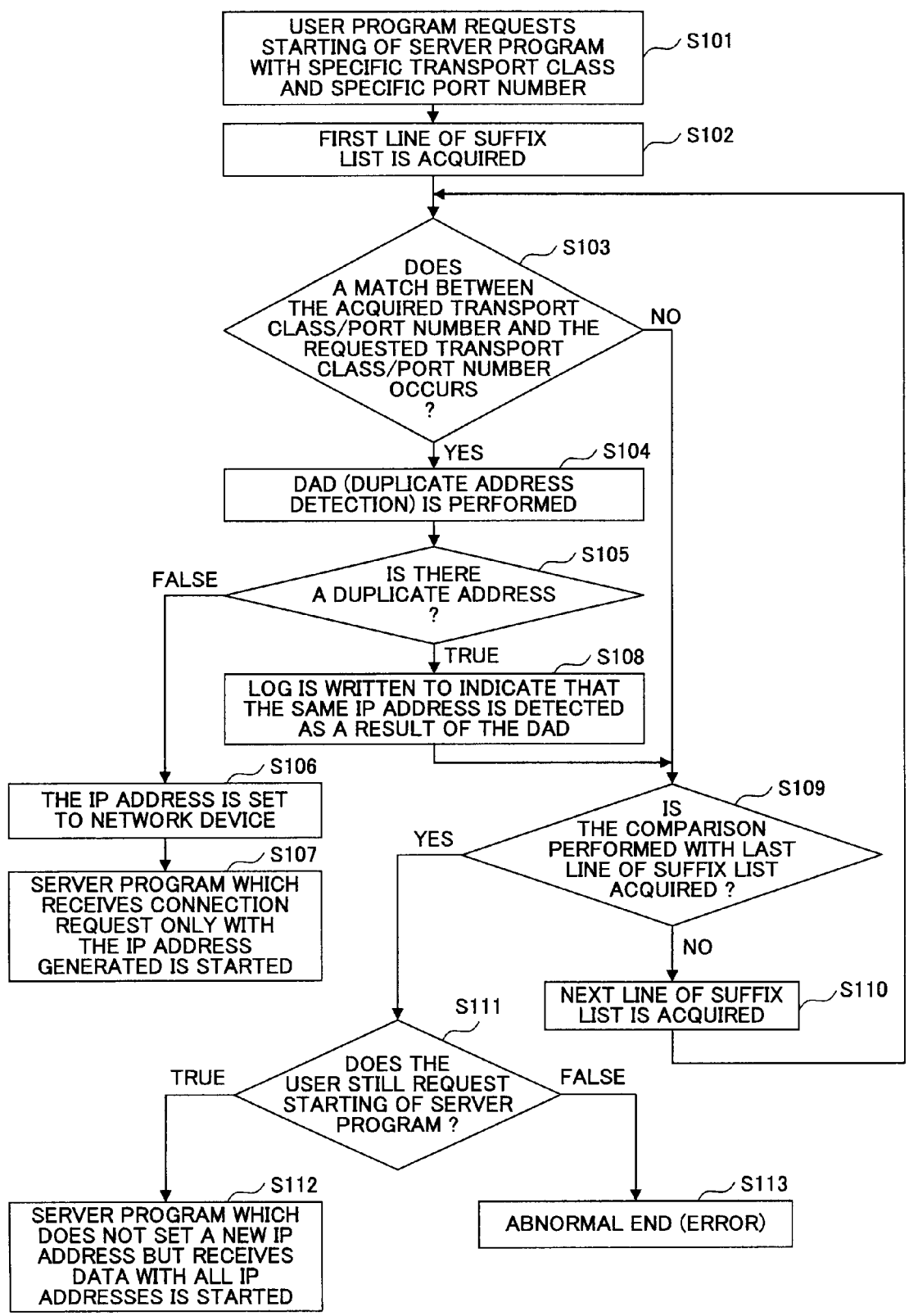
FIG. 17 is a flowchart for explaining the processing performed by a network device in an embodiment of the invention.

FIG. 17 is a flowchart for explaining the processing performed by the network device in this embodiment.

In the flowchart of FIG. 17, when the user program 15 requests starting of a server program with a specific transport type and a specific port number (step S101), the automatic IP-address setting layer 14 acquires the first line of the suffix list (FIG. 16) (step S102).

Subsequently, it is determined whether the transport type and the port number of the acquired line match with the transport type and the port number of the server program the starting of which is requested by the user (step S103).

When a match occurs at step S103, the suffix at the line of the suffix list corresponding to the existing prefix is set up, an IP address is generated with the suffix, and it is determined whether there is a duplicate IP address of the generated IP address in the same network (duplicate address detection (DAD)) (step S104, S105).

When the result of the determination at step S105 is negative (FALSE), the generated IP address is set up for the network device (step S106), and the server program which receives a connection request only with the generated IP address is started (step S107).

When the result of the determination at step S105 is affirmative (TRUE), the IP address overlaps, a log is written to indicate that the same IP address is discovered (step S108).

Subsequently, when a match of the transport type and the port number does not occur (NO of step S103) or after the writing of the log is performed (step S108), it is determined whether the line of the suffix list at which the comparison of the transport type and the port number is currently performed is the final line of the suffix list (step S109).

When the result of the determination at step S109 is negative, the next line of the suffix list is acquired (step S110), and the control is returned to the step S103 (the comparison of the transport type and the port number).

On the other hand, when the result of the determination at step S109 is affirmative (the final line of the suffix list), there is no line in the suffix list at which a match of the transport type and the port number occurs, or a match occurs but the suffix cannot be used due to address duplication. It is determined whether the user still requests starting of the server program in spite of the situation (step S111).

When the result of the determination at step S111 is affirmative, the server program which receives a connection request with all the IP addresses is started without setting up a new IP address (step S112).

When the result of the determination at step S111 is negative, an error is issued and the processing is ended (step S113).

For example, in the case of the suffix list of FIG. 16, if it is going to generate a server with the transport type "TCP" and the port number "80", the IP address with the suffix "::aaaa:aaaa:aaaa:aaaa" is first set up for the network device. When it is determined by the duplicates address check (DAD) that this IP address is already used, the IP address with the suffix from the next line of the suffix list which meets the same condition is subsequently set up for the network device. In this example, the IP address with the suffix "::bbbb:bbbb:bbbb:bbbb" is set up for the network device. After the IP address is set up, the listen processing using the IP address will be started.

According to the present invention, when a user program starts a network service, the network device has the functions to generate an IP address according to the service and to provide the network service using the IP address.

The service which that network device provides by this function will be provided using the IP address for exclusive use. That is, the service to be provided has an IP address for exclusive use with each service and the service is provided using the IP address. Accordingly, it is possible to facilitate discovering of the network service from another network device and the setting of filtering, routing, IPsec, etc. for every network service.

It is possible to easily specify the IP address about a desired network service by generating and setting up the IP address according to the port number of the service being provided, and providing the desired service using the generated IP address. For this reason, the user who desired to use the service can specify easily the IP address for which the service is provided, without using the existing system, such as DNS (domain name system). Accordingly, the user can easily use the network service which is provided by the server.

Even if it is in the situation where another network device already uses the IP address when the server provides a new service, and sets up the IP address according to the service for the server, an IP address that is near the IP address can be set up automatically. By this function, even if a duplicate IP address exists in the same network, the desired processing can be performed and the reliability of the network device improves.

Moreover, when two or more services of the same kind are started together in the same network, the two or more services of the same kind can coexist in the same network without causing interference of those IP addresses.

When the port number of the service being provided is included in the IPv6 address, the binary-coded decimal conversion and registering of the port number are performed. The port number of the decimal expression used as usual and the port number of the hexadecimal expression included in the IPv6 address apparently have the same numerical value, and even when the user refers to the IP address visually, the used is allowed to easily determine what kind of a network service can be provided by the IP address.

The present invention is not limited to the above-described embodiments, and variations and modifications may be made without departing from the scope of the present invention.

The present application is based on and claims the benefit of priority of Japanese patent application No. 2006-250041, filed on Sep. 14, 2006, and Japanese patent application No. 2007-217175, filed on Aug. 23, 2007, the entire contents of which are hereby incorporated by reference.

What is claimed is:

1. A network device which provides a plurality of network services according to a request of a user, the network device comprising:
   an IP-address generating unit configured to generate a unique IP address having a value objectively corresponding to one of the plurality of network services by embedding a port number in a part of the unique IP address; and
   a service provision unit configured to set up the generated unique IP address for the network device to provide said one of the plurality of network services using the generated unique IP address.

2. The network device according to claim 1, wherein the port number is of a TCP or a UDP, the part is a suffix part, and the unique IP address is an IPv6 address.

3. The network device according to claim 2, further comprising:
   a unit configured to perform a binary-coded decimal conversion of the port number before embedding the port number in the suffix part of the IPv6 address; and
   a unit configured to embed a port number value as a result of the binary-coded decimal conversion in the suffix part of the IPv6 address.

4. The network device according to claim 1, further comprising:
   a unit configured to determine, before setting up the generated unique IP address for the network device, whether the generated unique IP address is already used by another network device;
   a unit configured to change a numerical value of a suffix part of the generated unique IP address when the generated unique IP address is already used; and
   a unit configured to perform a duplication check of the changed IP address again.

5. An IP address setting controlling method for use in a network device which provides a plurality of network services according to a request of a user, the IP address setting controlling method comprising:

generating a unique IP address having a value objectively corresponding to one of the plurality of network services by embedding a port number in a part of the unique IP address; and setting up the generated unique IP address for the network device to provide the one of the plurality of network services using the generated unique IP address.

6. The IP address setting controlling method according to claim 5, wherein the port number is of a TCP or a UDP, the part is a suffix part, and the unique IP address is an IPv6 address.

7. The IP address setting controlling method according to claim 6, further comprising:

performing a binary-coded decimal conversion of the port number before embedding the port number in the suffix part of the IPv6 address; and embedding a port number value as a result of the binary-coded decimal conversion in the suffix part of the IPv6 address.

8. The IP address setting controlling method according to claim 5, further comprising:

determining, before setting up the generated unique IP address for the network device, whether the generated unique IP address is already used by another network device;

changing a numerical value of a suffix part of the generated unique IP address when the generated unique IP address is already used; and performing a duplication check of the changed IP address again.

* * * * *